(12) United States Patent
Billig

(10) Patent No.: US 7,188,018 B2
(45) Date of Patent: Mar. 6, 2007

(54) CONTROL DEVICE FOR AN AT LEAST PARTIALLY FOUR-WHEEL-DRIVEN MOTOR VEHICLE

(75) Inventor: Christian Billig, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/336,922

(22) Filed: Jan. 23, 2006

(65) Prior Publication Data

US 2006/0122756 A1  Jun. 8, 2006

Related U.S. Application Data

(63) Continuation of application No. PCT/EP04/08093, filed on Jul. 17, 2004.

(30) Foreign Application Priority Data

Jul. 24, 2003  (DE) ............... 103 33 655

(51) Int. Cl.
*F16D 48/12* (2006.01)
*G06F 17/00* (2006.01)

(52) U.S. Cl. ............... 701/69; 701/67; 701/68; 180/247; 180/248

(58) Field of Classification Search ........ 701/67, 701/68, 69; 192/54.1; 477/171, 179, 181; 180/247, 248

See application file for complete search history.

(56) References Cited

U.S. PATENT DOCUMENTS 5,101,315 A    3/1992  Ishikawa et al.
5,839,084 A *  11/1998 Takasaki et al. ............ 701/67
5,899,951 A    5/1999  Babbel et al.
5,927,425 A *  7/1999  Kusano .................. 180/248

(Continued)

FOREIGN PATENT DOCUMENTS

DE    3427225 C1    3/1986

(Continued)

OTHER PUBLICATIONS

International Search Report for PCT/EP2004/008093 dated Nov. 1, 2004.

(Continued)

*Primary Examiner*—Tan Q. Nguyen
(74) *Attorney, Agent, or Firm*—Crowell & Moring LLP

(57) ABSTRACT

In the case of a control device for an at least partially four-wheel-driven motor vehicle, having a control unit which can variably distribute the driving torque of a drive unit to primary driving wheels, which are permanently connected with the drive unit, and to secondary driving wheels, which, if required, can be connected by way of a transfer clutch with the drive unit, wherein the control unit determines a desired clutch torque which is to be set by an actuator device at the transfer clutch. The control unit is further configured such that, when the desired clutch torque is determined, at least one degree of stress to the transfer clutch and/or at least one degree of stress to the actuator device are taken into account. In this case, the taking into account of a short-duration degree of stress to the transfer clutch is particularly important with a view to a closing which is as fast as possible for preventing a slip.

19 Claims, 2 Drawing Sheets

U.S. PATENT DOCUMENTS 6,386,351 B1 * 5/2002 Salecker et al. ........... 192/54.1
6,745,885 B2 * 6/2004 Murakami et al. ........ 192/82 T

FOREIGN PATENT DOCUMENTS

| DE | 3702352 A1 | 8/1987 |
| DE | 10054023 A1 | 5/2002 |
| DE | 10060642 A1 | 6/2002 |
| DE | 10231787 A1 | 2/2003 |
| EP | 1188597 A2 | 3/2002 |
| EP | 1270305 A2 | 1/2003 |
| EP | 1400389 A2 | 3/2004 |
| JP | 5-286376 | 11/1993 |

OTHER PUBLICATIONS

German Examination reports for 103 33 655.9.

* cited by examiner

US 7,188,018 B2

CONTROL DEVICE FOR AN AT LEAST PARTIALLY FOUR-WHEEL-DRIVEN MOTOR VEHICLE

CROSS-REFERENCE TO RELATED APPLICATIONS

The present application is a continuation of International Patent Application No. PCT/EP2004/008093, filed Jul. 17, 2004, and claims priority under 35 U.S.C. § 119 to German Application No. 103 33 655.9-09, filed Jul. 24, 2003. The entire disclosure of the aforementioned documents is herein expressly incorporated by reference. This application contains subject matter which is related to the subject matter contained in application Ser. Nos. 11/336,933, 11/336,934, 11/336,925, and 11/337,047filed on even date herewith.

BACKGROUND AND SUMMARY OF THE INVENTION

The present invention relates to a control device for an at least partially four-wheel-driven motor vehicle. More particularly, the present invention relates to a control device for an at least partially four-wheel-driven motor vehicle, having a control unit which variably distributes driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by means of an actuator device at the transfer clutch.

A control device of this type is described, for example, in German Patent Document DE 100 54 023 A1. Accordingly, a torque distribution device is known for changing the torque distribution ratio between the wheels of the front axle and the wheels of the rear axle by a corresponding control of a friction clutch as a longitudinal blocking device (i.e., transfer clutch). The driving action of a vehicle can be influenced considerably by the determination of a torque distribution ratio. In particular, the object of German Patent Document DE 100 54 023 A1 relates to the driving dynamics when cornering. In this case, a partially four-wheel-driven motor vehicle may be a basically front-wheel-driven motor vehicle with a rear-wheel drive which can be connected by means of a transfer clutch; a basically rear-wheel-driven motor vehicle with a front-wheel drive which can be connected by way of a transfer clutch; or a permanent all-wheel drive vehicle with a controllable transfer clutch for changing the torque distribution between the front and rear axle.

In general, as described below, primary driving wheels are the wheels which are permanently connected with the drive unit, and secondary driving wheels are the wheels which, if required, can be connected with the drive unit by way of the transfer clutch.

Furthermore, such known control systems usually have a control of the transfer clutch as a function of the rotational speed difference between a rotational speed of the primary driving axle and the rotational speed of the secondary driving axle (for example, German Patent Document DE 34 27725 C2).

It is an object of the present invention to improve a control system of the initially mentioned type with respect to the availability of the transfer clutch and/or of the actuator device for controlling the transfer clutch.

The present invention is based on the recognition that, among other things, partly contradictory demands are the result of trying to achieve an increase of the availability of the transfer clutch and/or of the actuator device when determining the desired clutch torque. These different demands are first reflected inside the control unit by different intermediate desired clutch torques which have to be coordinated in order to obtain a final desired clutch torque which actually is to be set. An object of the present invention is, therefore, particularly a torque coordination in the form of a prioritization structure of different intermediate desired clutch torques which also take into account demands with respect to driving dynamics.

Other objects, advantages and novel features of the present invention will become apparent from the following detailed description of the invention when considered in conjunction with the accompanying drawings.

DETAILED DESCRIPTION OF THE DRAWINGS

Figure 1:
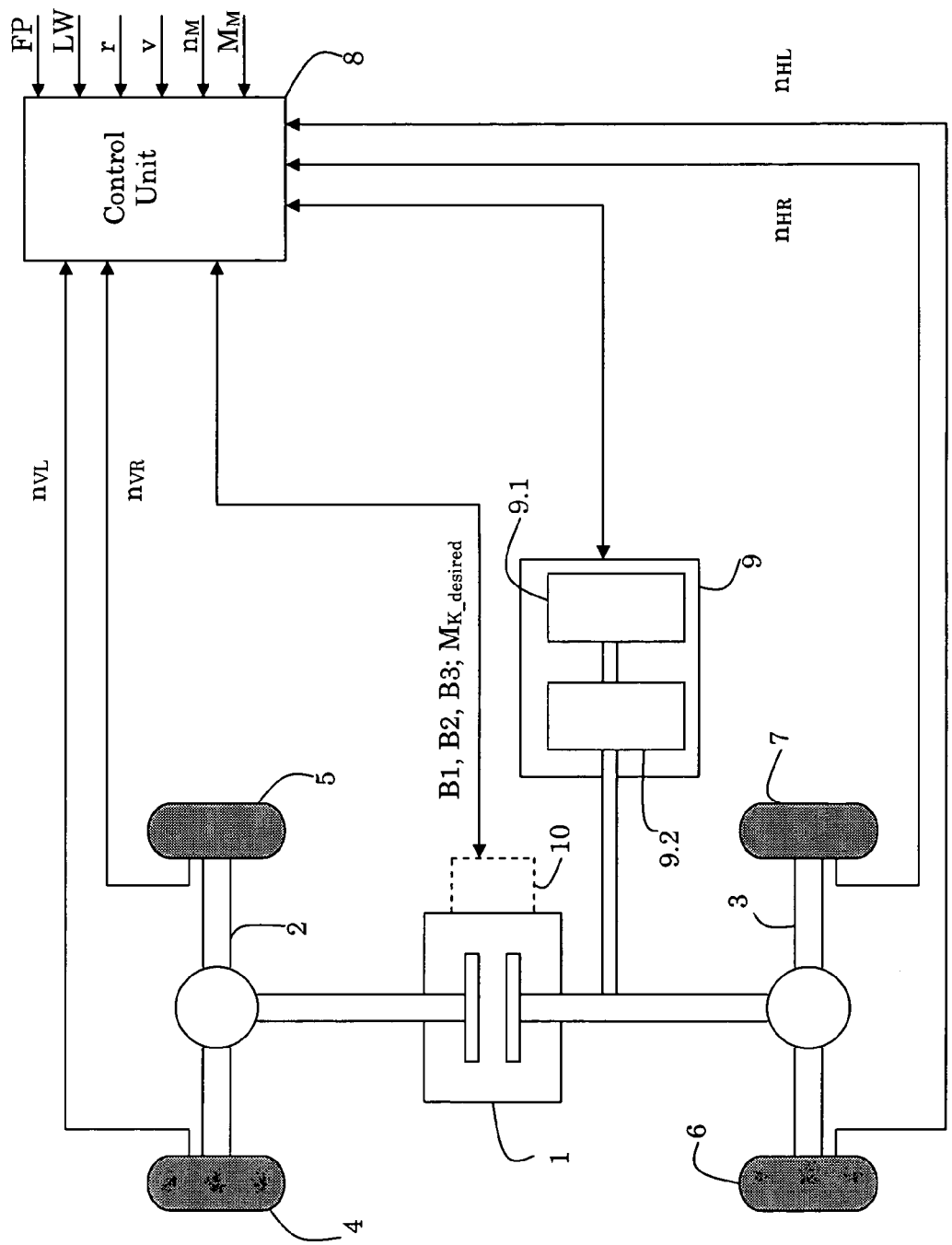
FIG. 1 is a schematic view of a partially four-wheel-driven vehicle with a transfer clutch, which can be adjusted by way of a control unit, on the example of a basically rear-wheel-driven motor vehicle with a front-wheel drive which can be connected by way of a transfer clutch, in accordance with the present invention.

FIG. 1 illustrates a partially four-wheel-driven vehicle in the form of a basically rear-wheel-driven motor vehicle with a front wheel drive, which, if required, can be connected by way of a transfer clutch 1. The transfer clutch 1 can be adjusted by a control unit 8. The control unit 8 may contain an outside-disposed additional control device 10 mounted, for example, in the proximity of, or directly on, the transfer clutch 1. The additional control device 10 may convert, for example, a defined desired clutch torque to electric current for controlling the adjusting unit (not shown here) of the transfer clutch 1. However, the control unit 8 does not have to be divided into two partial control devices.

In the case of a vehicle according to FIG. 1, while the transfer clutch 1 is open, the entire torque (i.e., driving torque) of the drive unit 9 is transferred to the wheels 6 and 7 of the rear axle 3. The drive unit 9 may include an internal-combustion engine 9.1, a transmission 9.2, and at least one drive control unit (not shown here in detail). The drive control unit may communicate, for example, by way of the known motor vehicle data bus CAN with the control unit 8. In FIG. 1, the rear wheels 6 and 7 are the primary driving wheels, because they are permanently connected with the drive unit 9. As the clutch torque at the transfer clutch 1 increases, the drive unit 9 also drives the wheels 4 and 5 of the front axle 2. The front wheels 4 and 5 are, therefore, the secondary driving wheels.

In addition to other input signals, the control unit 8 may detect or determine the position of the accelerator pedal FP, the steering angle LW, the yaw angle rate r, the rotational wheel speeds $n_{VL}$, $n_{HL}$, $n_{VR}$, and $n_{HR}$ of all wheels 4, 5, 6, and 7, respectively, the rotational speed $n_M$ of the internal-combustion engine, the internal-combustion engine torque $M_M$, and the vehicle speed v.

For the distribution of the driving torque of the drive unit 9, a clutch torque $M_{K\_desired}$ to be set may be defined for the transfer clutch 1 arranged between the drive unit 9 or the primary driving wheels 6 and 7 and the secondary driving wheels 4 and 5. The control unit 8 may emit the desired clutch torque $M_{K\_desired}$ to the additional control device 10.

The additional control device 10 may convert the desired clutch torque $M_{K\_desired}$ to a current for controlling the actuator device (not shown here separately).

In the case of a division into two partial control units, the control unit 8 may detect the degree of stress to the actuator device or the transfer clutch 1 from the additional control device 10 or determine it itself as a function of corresponding input signals. Here, a differentiation may be made between a long-duration degree B3 of stress to the oil disks of the transfer clutch 1, a short-duration degree B2 of stress to the oil disks of the transfer clutch 1, and a degree B1 of stress to the actuator. The actuator may be an electric motor, which moves a worm gear pair for opening and closing the oil disks. A degree of stress may be an absolute or relative value, which may be determined on the basis of the detection of frictional losses, characteristic damage curves, or temperature sequences.

Figure 2:
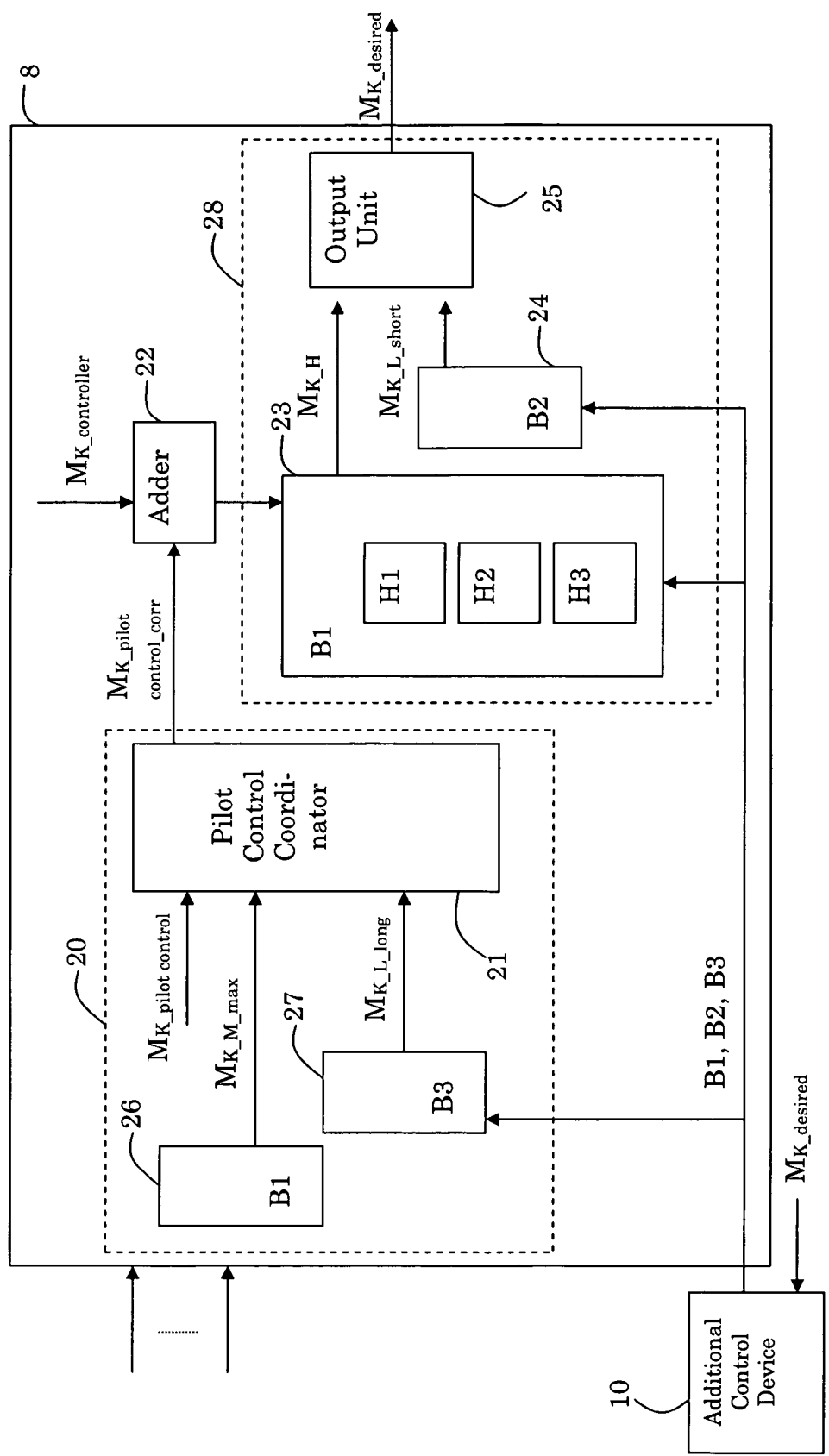
FIG. 2 illustrates an exemplary embodiment of a control unit, in accordance with the present invention.

Additional details of an exemplary embodiment of the control unit 8 are illustrated in FIG. 2.

A driving-dynamics-related control fraction $M_{K\_controller}$ may be determined in the control unit 8 while taking into account the wheel slip and the driving-dynamics-related quantities, such as oversteering and understeering, for the determination of the desired clutch torque $M_{K\_desired}$. In a pilot control unit (not shown here in detail), a basic pilot control fraction $M_{K\_pilot\ control}$ is determined as a function of determined input signals, which in particular allow a conclusion concerning the driver's intention, which basic pilot control fraction $M_{K\_pilot\ control}$ may be input to a pilot control coordinator 21.

In a long-duration protection block 27, the long-duration degree B3 of stress to the transfer clutch 1 is taken into account. The long-duration protection block 27 defines a maximally permissible clutch torque $M_{K\_L\_long}$ if the long-term degree B3 of stress is greater than a defined threshold. Here, the long-duration degree B3 of stress can be characterized, for example, by a determined so-called damage by friction losses. In an exemplary embodiment of the present invention, the maximally permissible clutch torque $M_{K\_L\_long}$ is defined only when a quantity proportional to the outside temperature is greater than a defined temperature threshold. This further development of the invention is based on the recognition that, in the event of a long-duration stress, a high outside temperature additionally increases the mechanical stress to the transfer clutch 1. The maximally permissible clutch torque $M_{K\_L\_long}$ may be outputted to the pilot control coordinator 21.

In the actuator protection block 26, an actuator-related limit torque $M_{K\_M\_max}$ can basically be defined as the degree B1 of stress to the actuator device or to the electric motor, for reducing the holding current of the actuator device. Also, as a function of exceeding several defined thresholds of the degrees of stress, several actuator-related limit torques $M_{K\_M\_max}$ can be defined. The actuator-related limit torque $M_{K\_M\_max}$ also may be outputted to the pilot control coordinator 21.

The pilot control coordinator 21 may carry out a minimal selection from available input signals. In particular, when a maximally permissible clutch torque $M_{K\_L\_long}$ and an actuator-related limit torque $M_{K\_M\_max}$ are defined, the smaller of the two torques is selected. However, if a higher basic pilot control fraction $M_{K\_pilot\ controller}$ is present, as an alternative, the actuator-related limit torque $M_{K\_M\_max}$ may also have a higher priority than the maximally permissible clutch torque $M_{K\_L\_long}$, because long-duration effects are more likely to be assigned a lower priority than short-duration effects. Therefore, instead of a minimal selection, as an alternative, the actuator-related limit torque $M_{K\_M\_max}$ can also be assigned a higher priority than the maximally permissible clutch torque $M_{K\_L\_long}$.

The output torque $M_{K\_pilot\ controller\_corr}$ of the pilot control coordinator 21 is a corrected basic pilot control fraction in which, therefore, at least the degree B1 of stress to the actuator with respect to a possibly required reduction of the holding current and the long-duration degree B3 of stress to the oil disks of the transfer clutch 1 are taken into account.

In the adder 22, the adding-up of the output torque $M_{K\_pilot\ controller\_corr}$ of the pilot control coordinator 21 and the driving-dynamics-related control fraction $M_{K\_controller}$ takes place. The output signal of the adder 22 is the input signal of a hysteresis unit 23, by means of which hysteresis bands are expanded as the degree B1 of stress to the actuator or to the electric motor rises for reducing the adjusting frequency of the actuator device. In the illustrated exemplary embodiment, three different hysteresis bands are placed in the hysteresis unit 23 for this purpose. A relatively narrow hysteresis band H1 is selected until a first threshold of the degree of stress is reached; a medium hysteresis band H2 is selected until a second threshold of the degree of stress is reached; and a relatively wide hysteresis band H3 is selected when the third threshold of the degree of stress is exceeded. On the whole, generally, as the degree B1 of stress to the actuator device rises, the desired clutch torque $M_{K\_desired}$ may be determined such that the adjusting frequency of the actuator device is reduced.

The output signal of the hysteresis unit 23 is the input signal of the output unit 25. In the output unit 25, a maximal selection may be carried out between the torque $M_{K\_H}$ on which the output signal of the hysteresis unit 23 is based and a minimally required clutch torque $M_{K\_L\_short}$ based on taking into account the short-duration degree B2 of stress to the transfer clutch 1. The minimally required clutch torque $M_{K\_L\_short}$ may be defined by a short-duration protection block 24, when the short-duration degree B2 of stress is greater than a defined threshold.

Thus, in the output unit 25, the desired clutch torque $M_{K\_desired}$ to be actually set may be finally determined after a torque coordination of different intermediate desired clutch torques inside the control unit and may be outputted to the additional control device 10.

In the exemplary embodiment illustrated in FIG. 2, the following prioritization structure is achieved with respect to taking into account the degree B1 of stress to the actuator, the short-duration degree B2 of stress to the transfer clutch 1, and the long-duration degree B3 of stress to the transfer clutch.

The definition of the minimally required clutch torque $M_{K\_L\_short}$ based on taking into account the short-duration degree B2 of stress, may be assigned a higher priority in comparison to the definition of a maximally permissible clutch torque $M_{K\_L\_long}$ based on taking into account the long-duration degree B3 of stress.

The definition of the minimally required clutch torque $M_{K\_L\_short}$ based on taking into account the short-duration degree B2 of stress to the transfer clutch 1 may be assigned a higher priority in comparison to a definition of an actuator-related limit torque $M_{K\_M\_max}$ based on taking into account the degree B1 of stress to the actuator device.

The definition of an actuator-related limit toque $M_{K\_M\_max}$, based on taking into account the degree B1 of stress to the actuator device for reducing the holding current is assigned a higher priority in comparison to a definition of a maximally permissible clutch torque $M_{K\_L\_long}$, based on taking into account the long-duration degree B3 of stress to the transfer clutch 1. Alternatively, when an actuator-related limit torque $M_{K\_M\_max}$ is defined based on taking into account the degree B1 of stress to the actuator device for reducing the holding current and when a maximally permissible clutch torque $M_{K\_L\_long}$ is defined, a minimal selection can be made.

However, other embodiments of a controller and computation blocks are also conceivable by means of which the same prioritization structure can be achieved.

On the whole, according to the present invention, the following prioritization list may be obtained, starting with the highest priority:

1. Taking into account the short-duration degree B2 of stress to the transfer clutch 1 with a view to a closing, which is as fast as possible, for preventing a slip.
2. Taking into account the degree B1 of stress to the actuator with a view to reducing the adjusting frequency to protect from overheating.
3. Taking into account the degree B1 of stress to the actuator with a view to reducing the holding current to protect from overheating.
4. Taking into account the long-duration degree B3 of stress to the transfer clutch 1 with a view to an opening, which is as fast as possible for preventing power loss.
5. As an alternative to 3. and 4.: Minimal selection while taking into account the degree B1 of stress to the actuator with a view to reducing the holding current and taking into account the long-duration degree B3 of stress to the transfer clutch 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device for an at least partially four-wheel-driven motor vehicle, having a control unit which variably distributes driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by means of an actuator device at the transfer clutch, wherein, when the desired clutch torque is determined, at least one degree of stress to the transfer clutch or at least one degree of stress to the actuator device are taken into account;

wherein a short-duration degree of stress and a long-duration degree of stress to the transfer clutch are taken into account, a rising short-duration degree of stress having a torque-increasing effect when determining the desired clutch torque, and a rising long-duration degree of stress having a torque-reducing effect when determining the desired clutch torque, wherein the taking into account of the short-duration degree of stress is assigned a higher priority than the taking into account of the long-duration degree of stress.

2. The control device according to claim 1, wherein, when determining the desired clutch torque, a minimally required clutch torque is defined if the short-duration degree of stress is greater than a defined threshold.

3. The control device according to claim 1, wherein, when determining the desired clutch torque, a maximally permissible clutch torque is defined if the long-duration degree of stress is greater than a defined threshold.

4. The control device according to claim 1, wherein a definition of a minimally required clutch torque based on taking into account the short-duration degree of stress is assigned a higher priority in comparison to a definition of a maximally permissible clutch torque based on taking into account the long-duration degree of stress.

5. The control device according to claim 1, wherein, as the degree of stress to the actuator device rises, the desired clutch torque is determined such that an adjusting frequency of the actuator device is reduced.

6. A control device for an at least partially four-wheel-driven motor vehicle, having a control unit which variably distributes driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by means of an actuator device at the transfer clutch, wherein, when the desired clutch torque is determined, at least one degree of stress to the transfer clutch or at least one degree of stress to the actuator device are taken into account;

wherein a short-duration degree of stress to the transfer clutch is taken into account, and wherein, when determining the desired clutch torque, a minimally required clutch torque is defined if the short-duration degree of stress is greater than a defined threshold.

7. The control device according to claim 6, wherein, when determining the desired clutch torque, a maximally permissible clutch torque is defined if the long-duration degree of stress is greater than a defined threshold.

8. The control device according to claim 6, wherein a definition of the minimally required clutch torque based on taking into account the short-duration degree of stress is assigned a higher priority in comparison to a definition of a maximally permissible clutch torque based on taking into account the long-duration degree of stress.

9. The control device according to claim 6, wherein, as the degree of stress to the actuator device rises, the desired clutch torque is determined such that an adjusting frequency of the actuator device is reduced.

10. A control device for an at least partially four-wheel-driven motor vehicle, having a control unit which variably distributes driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by means of an actuator device at the transfer clutch, wherein, when the desired clutch torque is determined, at least one degree of stress to the transfer clutch or at least one degree of stress to the actuator device are taken into account;

wherein a long-duration degree of stress to the transfer clutch is taken into account, and wherein, when determining the desired clutch torque, a maximally permissible clutch torque is defined if the long-duration degree of stress is greater than a defined threshold.

11. The control device according to claim 10, wherein the maximally permissible clutch torque is defined only if a quantity proportional to an outside temperature is greater than a defined temperature threshold.

12. The control device according to claim 11, wherein a definition of a minimally required clutch torque based on taking into account the short-duration degree of stress is assigned a higher priority in comparison to a definition of the maximally permissible clutch torque based on taking into account the long-duration degree of stress.

13. The control device according to claim 10, wherein a definition of a minimally required clutch torque based on taking into account the short-duration degree of stress is assigned a higher priority in comparison to a definition of the maximally permissible clutch torque based on taking into account the long-duration degree of stress.

14. A control device for an at least partially four-wheel-driven motor vehicle, having a control unit which variably distributes driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by means of an actuator device at the transfer clutch,
- wherein, when the desired clutch torque is determined, at least one degree of stress to the transfer clutch or at least one degree of stress to the actuator device are taken into account;
- wherein the definition of a minimally required clutch torque based on taking into account the short-duration degree of stress is assigned a higher priority in comparison to the definition of a maximally permissible clutch torque based on taking into account the long-duration degree of stress.

15. A control device for an at least partially four-wheel-driven motor vehicle, having a control unit which variably distributes driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by means of an actuator device at the transfer clutch,
- wherein, when the desired clutch torque is determined, at least one degree of stress to the transfer clutch or at least one degree of stress to the actuator device are taken into account;
- wherein, as the degree of stress to the actuator device rises, the desired clutch torque is determined such that an adjusting frequency of the actuator device is reduced.

16. The control device according to claim 15, wherein, in front of the output of the desired clutch torque, a hysteresis unit is provided, and wherein, as the degree of stress rises, hysteresis bands are expanded for reducing the adjusting frequency of the actuator device.

17. A control device for an at least partially four-wheel-driven motor vehicle, having a control unit which variably distributes driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by means of an actuator device at the transfer clutch,
- wherein, when the desired clutch torque is determined, at least one degree of stress to the transfer clutch or at least one degree of stress to the actuator device are taken into account;
- wherein, as the degree of stress to the actuator device rises, the desired clutch torque is determined such that a holding current of the actuator device can be reduced by defining an actuator-related limit torque.

18. A control device for an at least partially four-wheel-driven motor vehicle, having a control unit which variably distributes driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by means of an actuator device at the transfer clutch,
- wherein, when the desired clutch torque is determined, at least one degree of stress to the transfer clutch or at least one degree of stress to the actuator device are taken into account;
- wherein, when determining the desired clutch torque, a definition of a minimally required clutch torque, based on taking into account a short-duration degree of stress to the transfer clutch, is assigned a higher priority in comparison to a definition of an actuator-related limit torque based on taking into account a degree of stress to the actuator device.

19. A control device for an at least partially four-wheel-driven motor vehicle, having a control unit which variably distributes driving torque of a drive unit to primary driving wheels, which are permanently connected with the drive unit, and to secondary driving wheels which, if required, can be connected by way of a transfer clutch with the drive unit, wherein the control unit determines a desired clutch torque which is to be set by means of an actuator device at the transfer clutch,
- wherein, when the desired clutch torque is determined, at least one degree of stress to the transfer clutch or at least one degree of stress to the actuator device are taken into account;
- wherein, when determining the desired clutch torque, a definition of an actuator-related limit torque, based on taking into account a degree of stress to the actuator device, is assigned a higher priority in comparison to a definition of a maximally permissible clutch torque, based on taking into account a long-duration degree of stress to the transfer clutch.

* * * * *